May 29, 1956  A. THOMAS  2,747,669
MACHINES CONTROLLED BY STATISTICAL RECORD CARDS
Filed July 30, 1953  16 Sheets-Sheet 1

Inventor
ARTHUR THOMAS
By
Attorney

May 29, 1956   A. THOMAS   2,747,669

MACHINES CONTROLLED BY STATISTICAL RECORD CARDS

Filed July 30, 1953   16 Sheets-Sheet 2

FIG. 4.

| KIND OF CARD | DATA INDICATING POSITIONS CARD COL. N° 31 | STOP BASKET | SIGNALS FROM DUMMY CARD COLUMNS | END-OF-CARD CYCLE OF SHAFT 10 | | | |
|---|---|---|---|---|---|---|---|
| | | | | 1 | 2 | 3 | 4 |
| FIRST BALANCE: DEBIT | N°s 2, 4, 5 | STOP 150b | S  LS | D  L F | F S  C R | C R | |
| FIRST BALANCE: CREDIT | N°s 2, 3, 5 | STOP 150c | S  LS | C  L F | F S  C R | C R | |
| ENTRY DEBIT | N° 4 | STOP 150a | S  LS | L F | F S  C R | C R | |
| ENTRY CREDIT | N° 3 | STOP 150a | S  LS | L F | F S  C R | C R | |
| LAST BALANCE: DEBIT | N°s 2, 4 | STOP 150d | S  LS  FS | D  C R | BELL | BELL | |
| LAST BALANCE: CREDIT | N°s 2, 3 | STOP 150e | S  LS  FS | C  C R | BELL | BELL | |

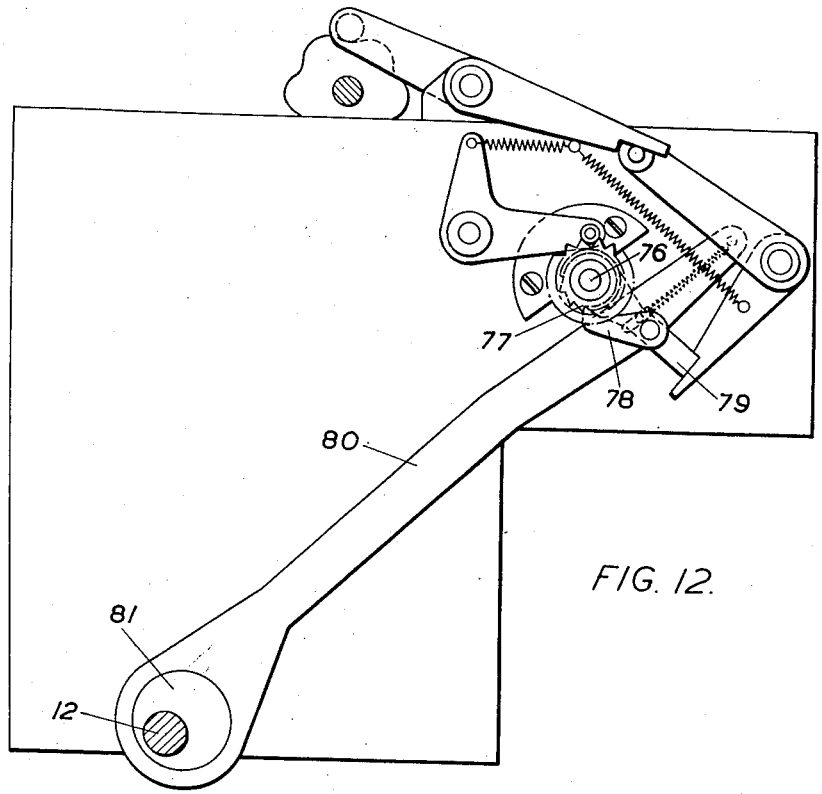

FIG. 12.

Inventor
ARTHUR THOMAS
By
Attorney

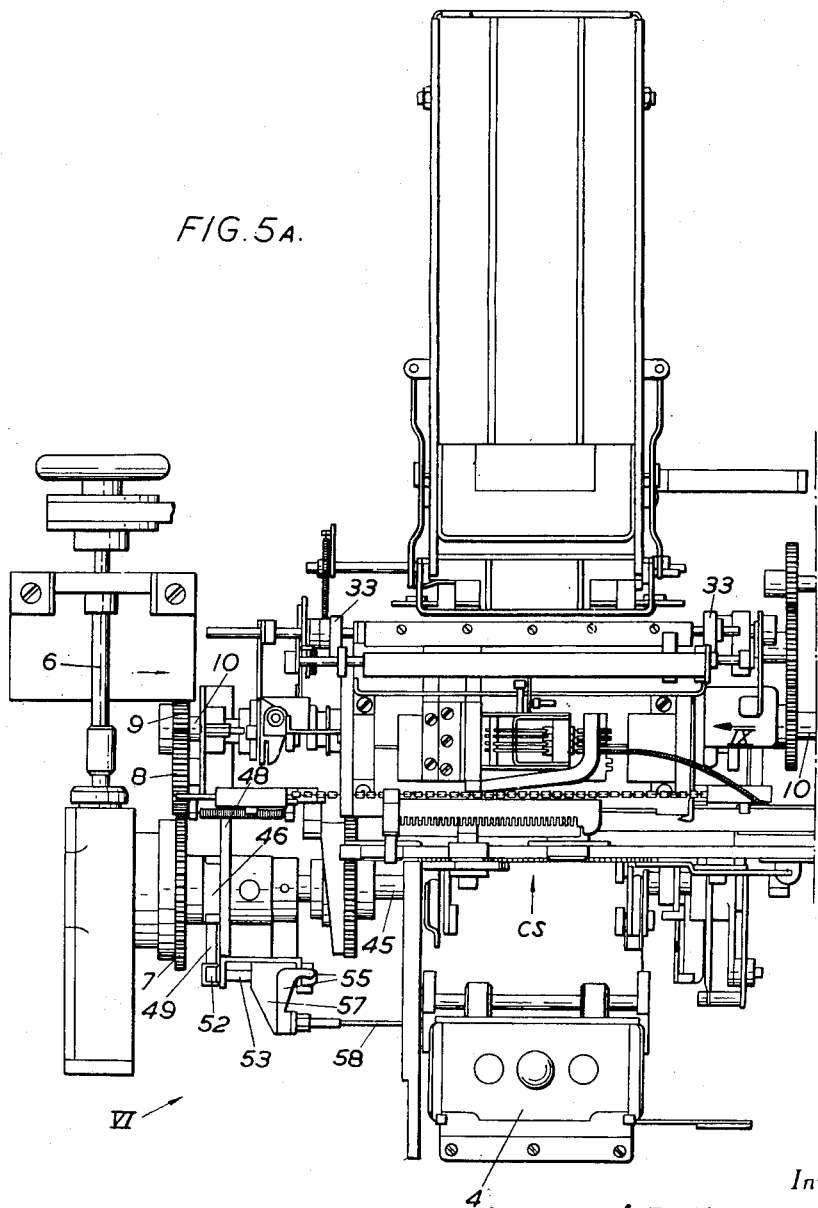

Inventor
ARTHUR THOMAS
By [signature]
Attorney

May 29, 1956　　　　　　A. THOMAS　　　　　　2,747,669
MACHINES CONTROLLED BY STATISTICAL RECORD CARDS
Filed July 30, 1953　　　　　　　　　　　　16 Sheets-Sheet 6
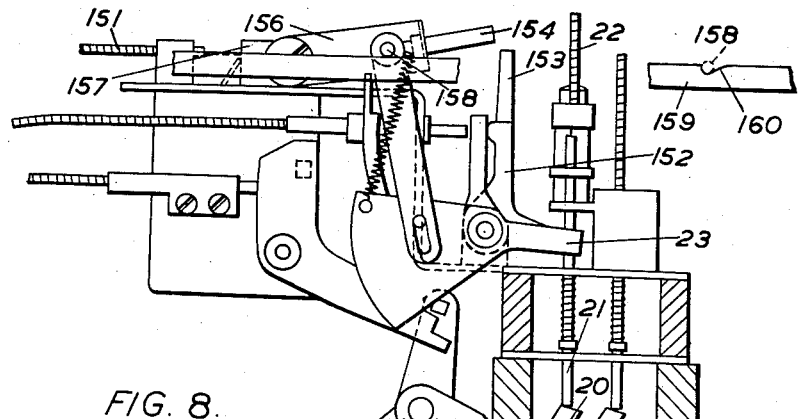
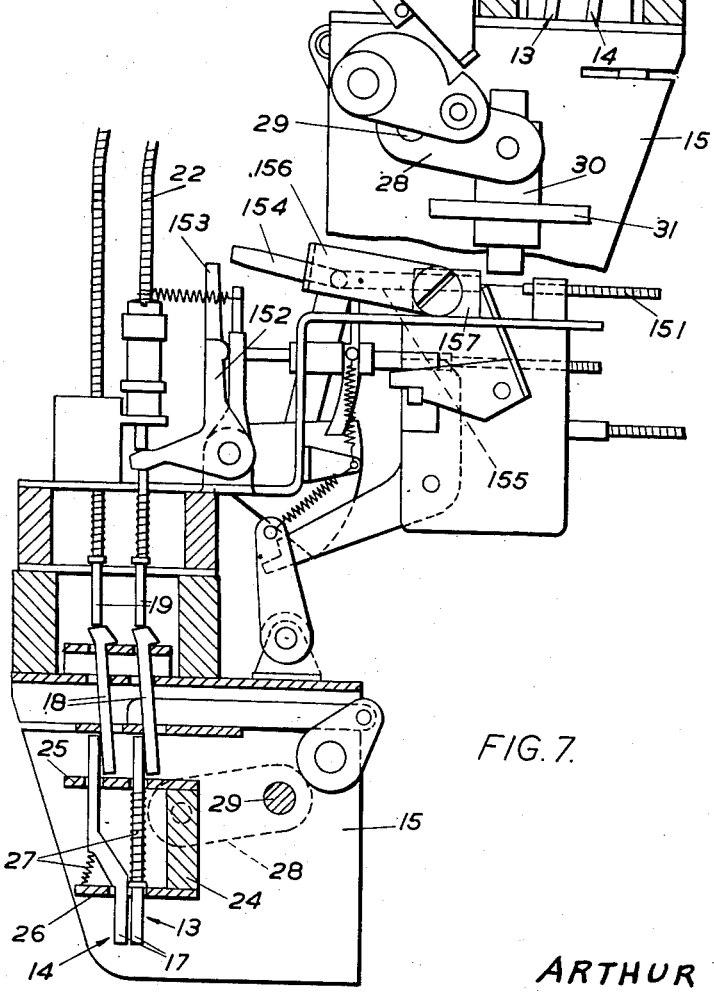
Inventor
ARTHUR THOMAS
By
　　　Attorney May 29, 1956　　　A. THOMAS　　　2,747,669
MACHINES CONTROLLED BY STATISTICAL RECORD CARDS
Filed July 30, 1953　　　16 Sheets-Sheet 7

Inventor
ARTHUR THOMAS
By
Attorney

May 29, 1956  A. THOMAS  2,747,669
MACHINES CONTROLLED BY STATISTICAL RECORD CARDS
Filed July 30, 1953  16 Sheets-Sheet 8
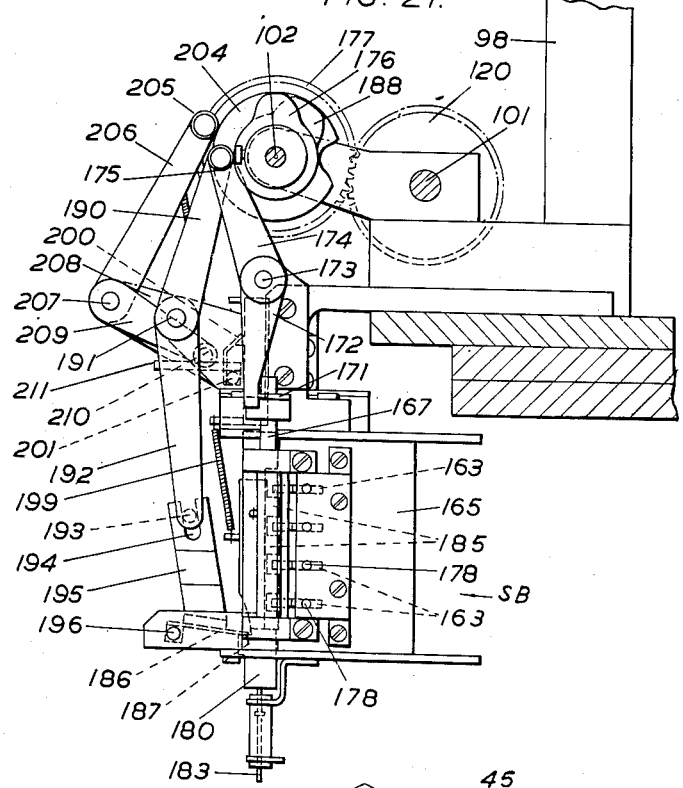
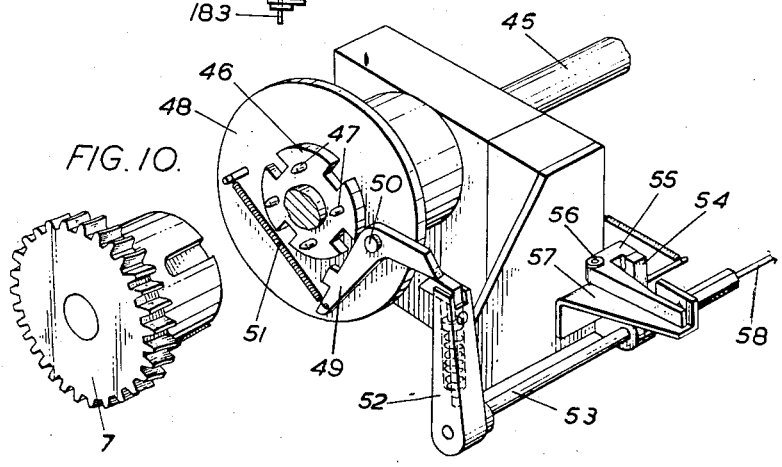
Inventor
ARTHUR THOMAS
By
Attorney May 29, 1956  A. THOMAS  2,747,669
MACHINES CONTROLLED BY STATISTICAL RECORD CARDS
Filed July 30, 1953  16 Sheets-Sheet 10

Inventor
ARTHUR THOMAS
By
Attorney

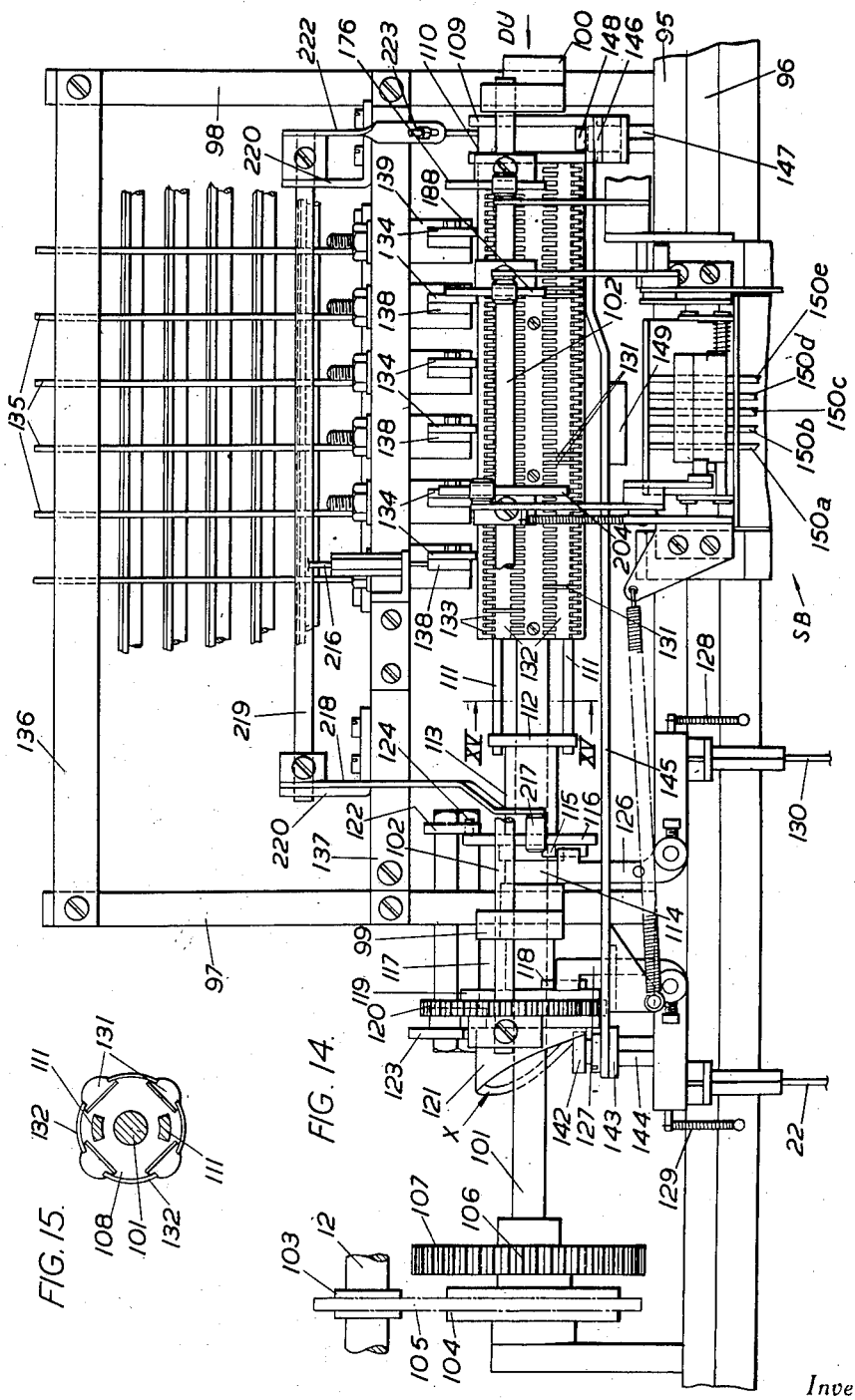

May 29, 1956  A. THOMAS  2,747,669
MACHINES CONTROLLED BY STATISTICAL RECORD CARDS
Filed July 30, 1953  16 Sheets-Sheet 12
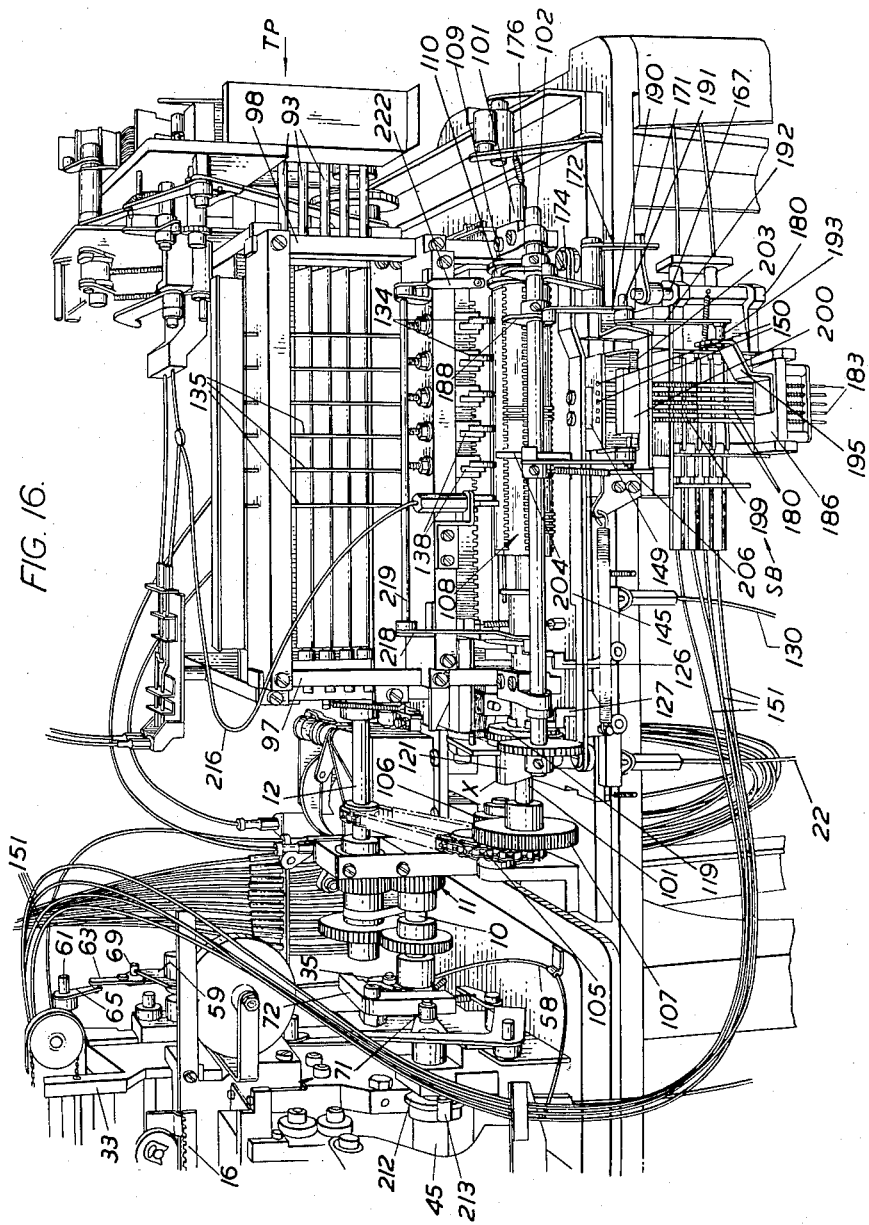
FIG. 16.
Inventor
ARTHUR THOMAS
By
Attorney

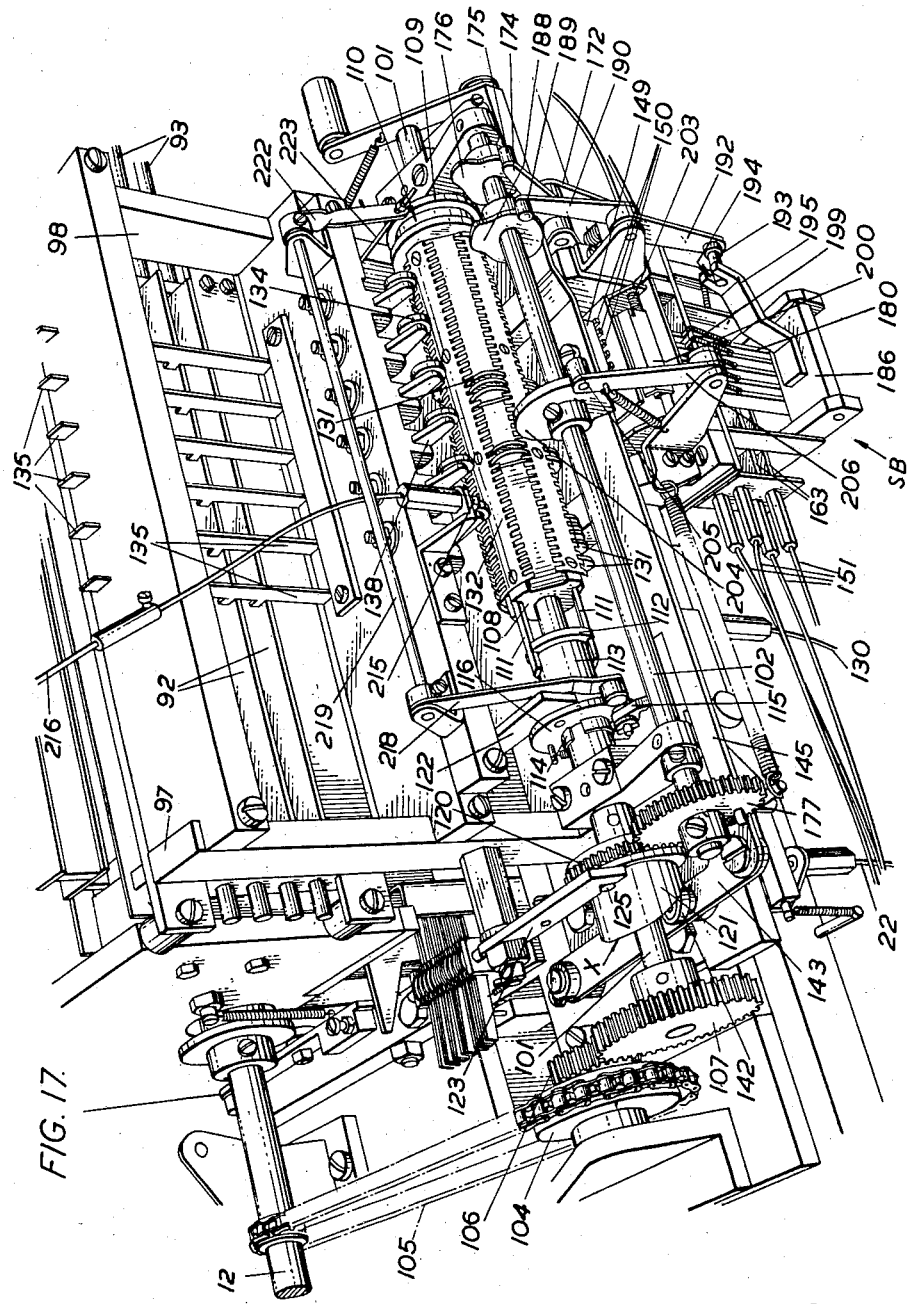

May 29, 1956  A. THOMAS  2,747,669
MACHINES CONTROLLED BY STATISTICAL RECORD CARDS
Filed July 30, 1953  16 Sheets-Sheet 14
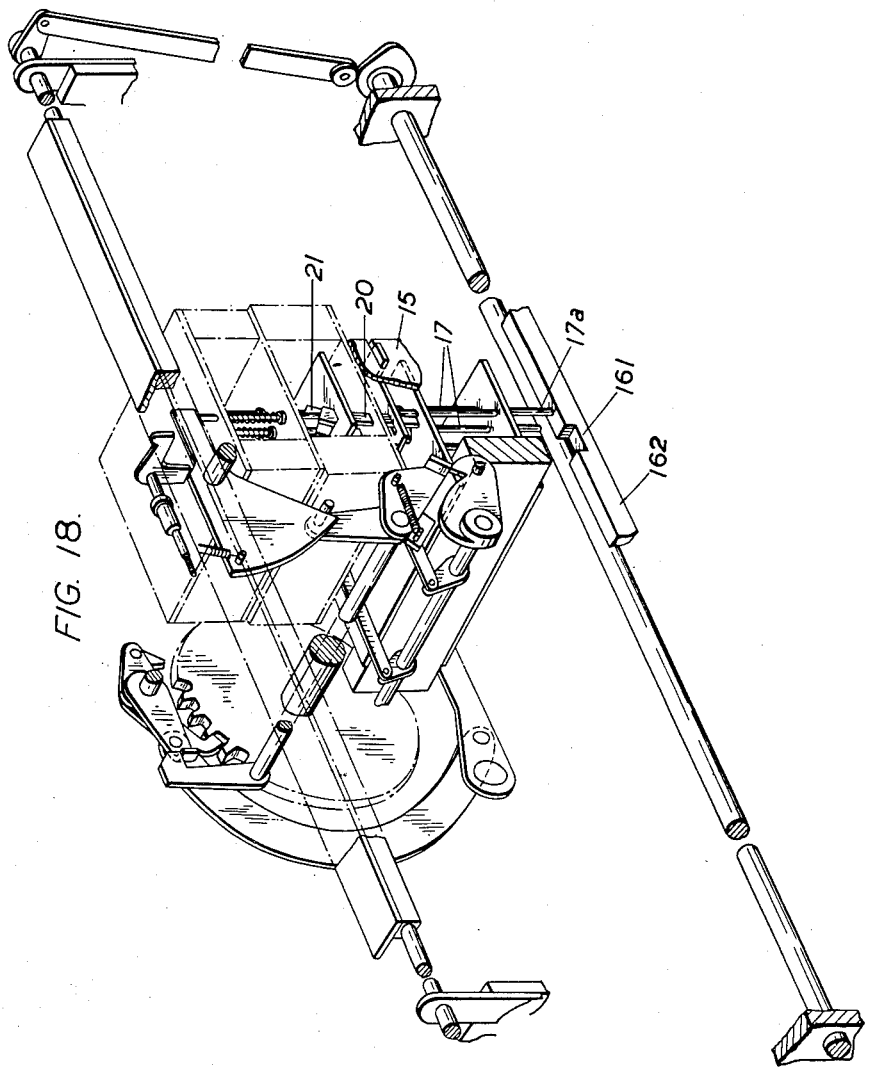
Inventor
ARTHUR THOMAS
By
Attorney May 29, 1956 A. THOMAS 2,747,669
MACHINES CONTROLLED BY STATISTICAL RECORD CARDS
Filed July 30, 1953 16 Sheets-Sheet 15
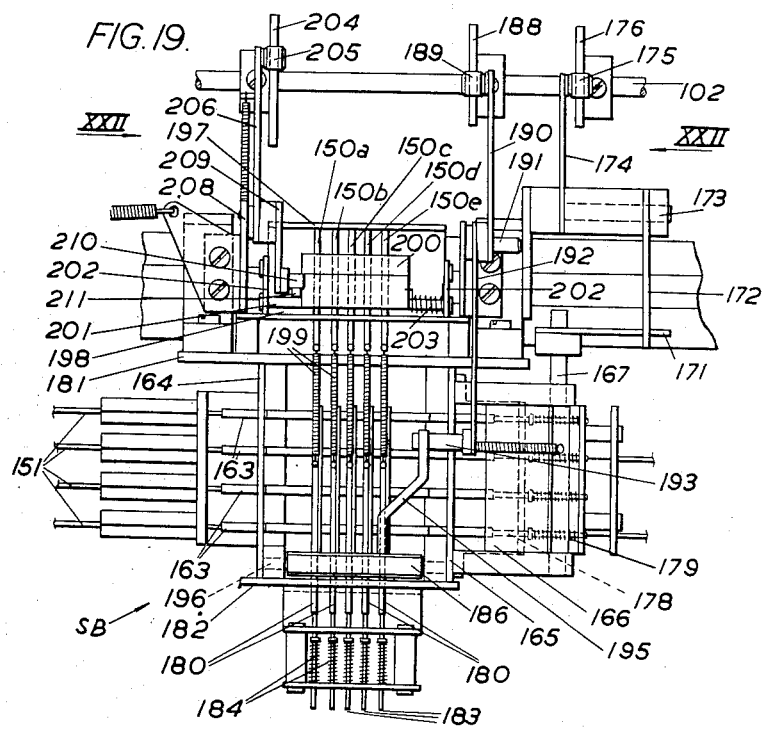
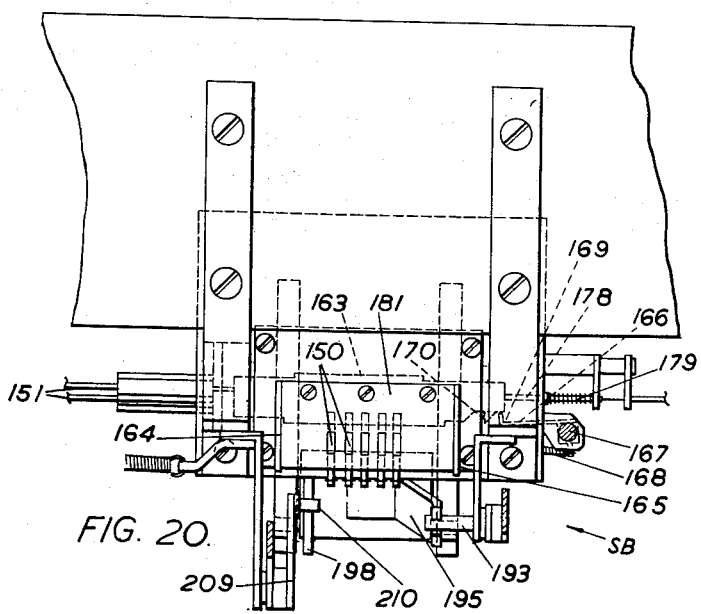
Inventor
ARTHUR THOMAS
By
Attorney May 29, 1956 A. THOMAS 2,747,669
MACHINES CONTROLLED BY STATISTICAL RECORD CARDS
Filed July 30, 1953 16 Sheets-Sheet 16
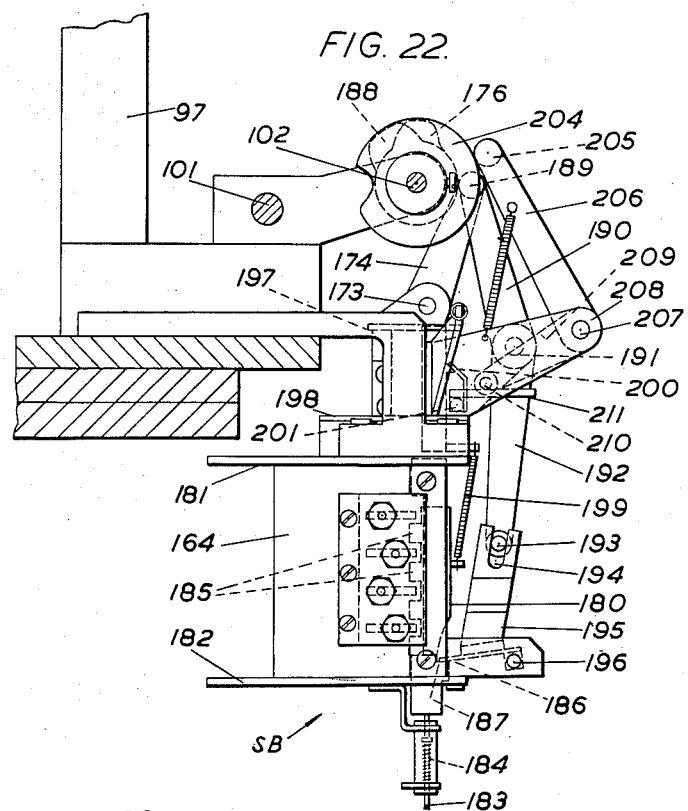
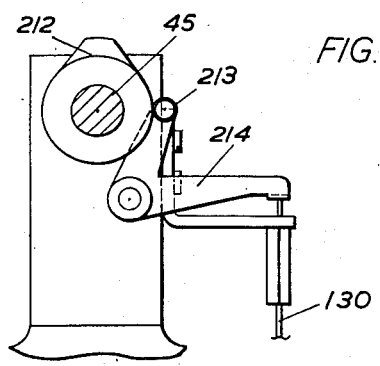
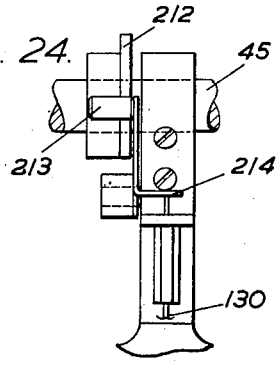
Inventor
ARTHUR THOMAS
By *[signature]*
Attorney

United States Patent Office 2,747,669
Patented May 29, 1956

2,747,669

MACHINE CONTROLLED BY STATISTICAL RECORD CARDS

Arthur Thomas, Wallington, England, assignor to Powers-Samas Accounting Machines Limited, London, England, a British company Application July 30, 1953, Serial No. 371,249

Claims priority, application Great Britain October 2, 1952

10 Claims. (Cl. 164—114)

This invention relates to machines controlled by statistical record cards and in particular to a machine in which data recorded on a statistical record card is transmitted column by column to a translator unit in which it is translated into code form and from which it is transmitted to a recording unit whereby the coded form of the data is recorded on a tape.

As will be well understood in the art the tape is employed to control a machine, such as a teleprinter, which produces a printed record of the data in decoded form.

As the tape is to be employed to control a machine as aforesaid the coded data recorded on the tape as the result of the sensing of each record card must be succeeded by a number of signals of predetermined significance such signals differing according to the kind of card from which data has been sensed and it is a main object of the present invention to provide an apparatus which, as determined by control indicia contained by the record card, will select the order of the predetermined signals as required by the card and condition the recording unit to effect recording thereof on the tape following the last signal representative of data recorded on a record card.

According to the present invention there is provided in a machine for recording data indicating signals on a tape under control of statistical record cards, apparatus for recording on the tape signals of predetermined significance in succession to signals representative of data recorded on a record card, said apparatus comprising a sensing device responsive to data indications on a record card and movable stepwise column by column in relation to a record card, a tape recording unit including tape feeding means and recording elements operable to record signals on a tape fed by the tape feeding means, a continuously rotatable driving shaft coupled to the sensing device and to the tape recording unit to effect operation thereof, the tape recording unit being operable to record a signal on the tape during each revolution of the driving shaft, conditioning means to receive signals from the sensing device and to condition the recording elements for a recording operation in accordance with the signals so received, and a signal selector unit to initiate a group of successive end-of-card signals from a range of groups, said selector unit being coupled to the conditioning means and operable under control of the sensing device to select a group of signals from said range thereof and condition the recording elements to record the signals of the group on the tape.

In order that the invention may be clearly understood one embodiment thereof will now be described, by way of example, with reference to the accompanying diagrammatic drawings in which:

Fig. 1 illustrates a record card having data and control perforations formed therein;

Fig. 2 illustrates a portion of a tape having the data from a debit entry card recorded thereon together with signals of predetermined significance which follow the data and some of which are included for controlling a printing machine which operates under control of the tape;

Figure 5B:
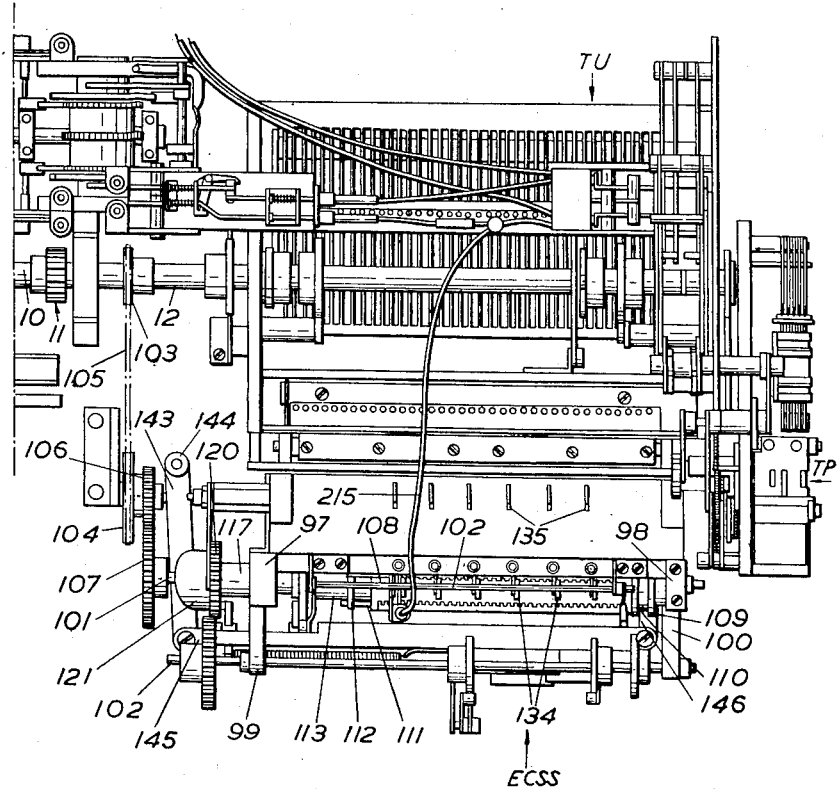
Figure 6:
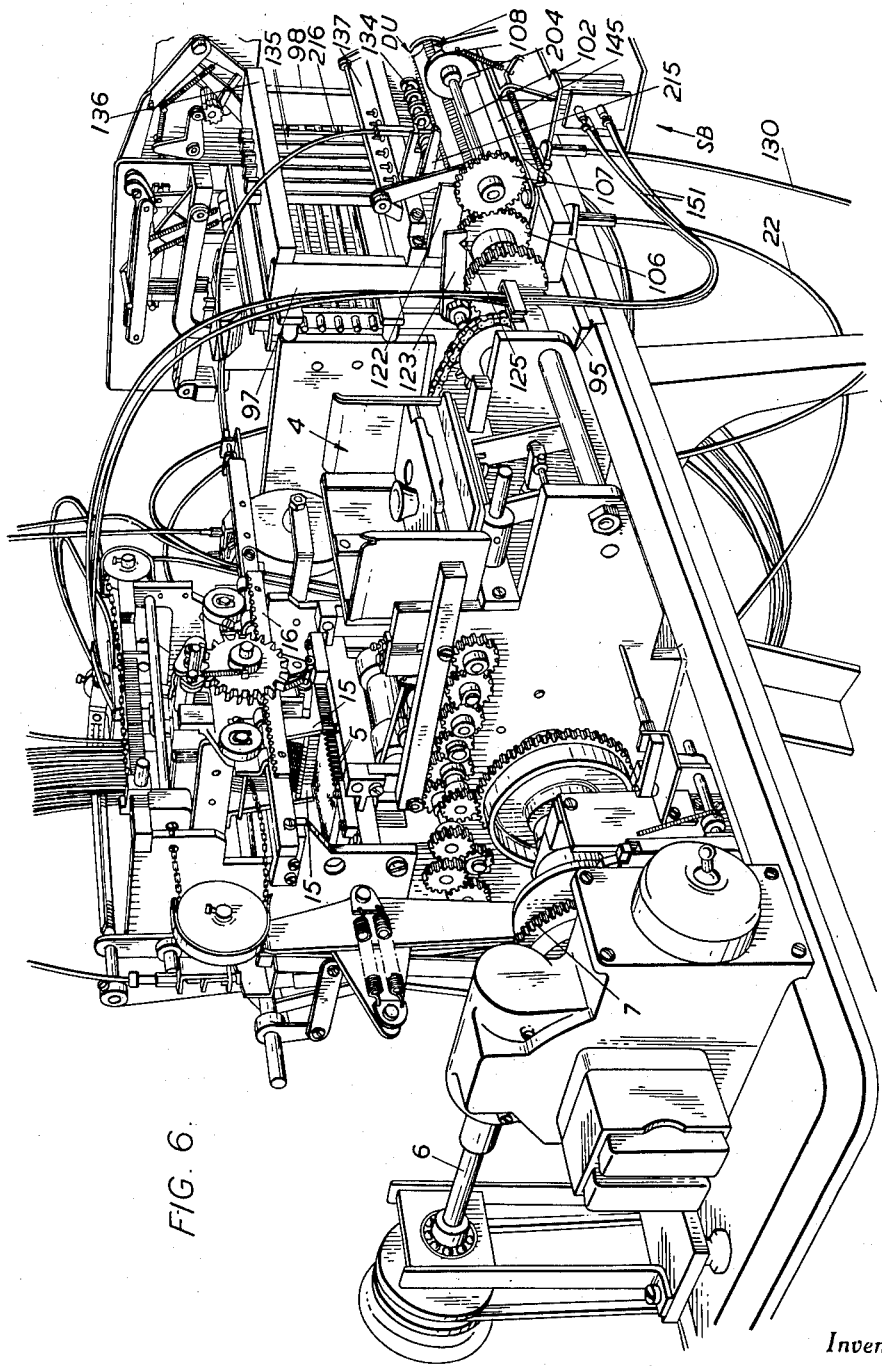
Figure 9:
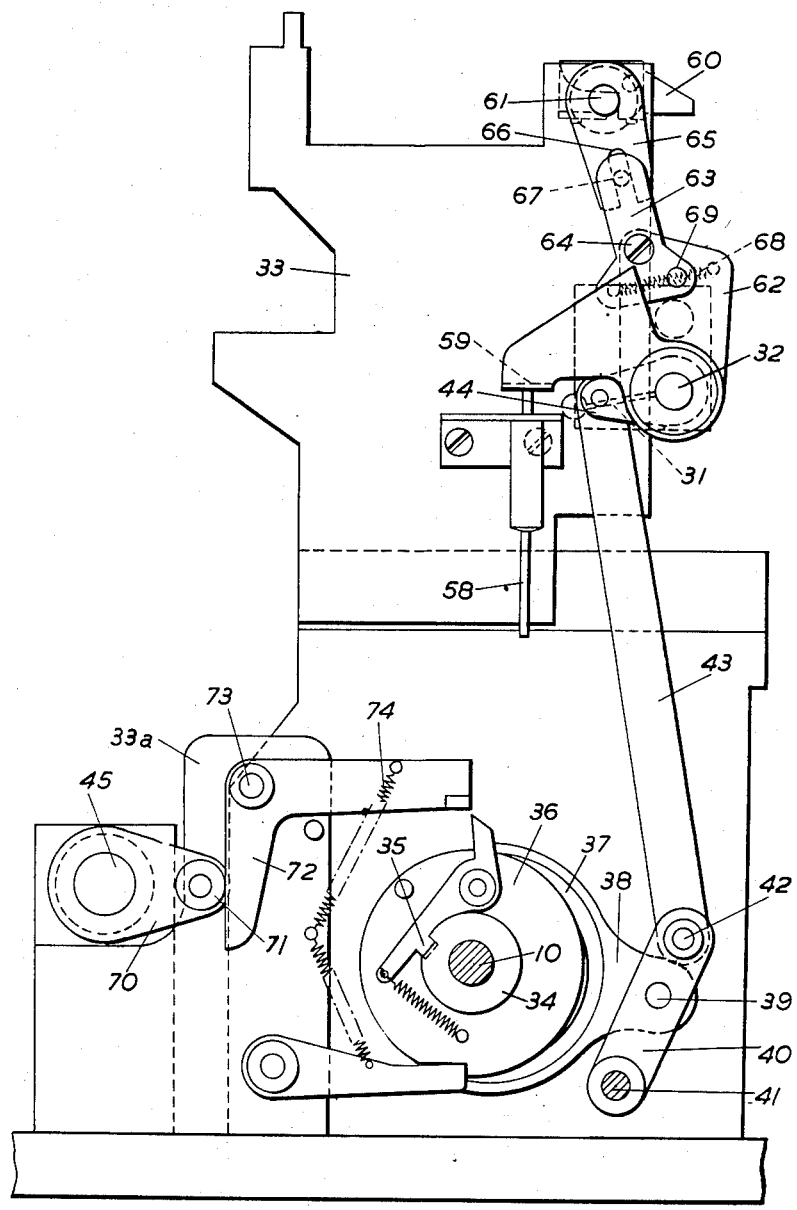
Figure 11:
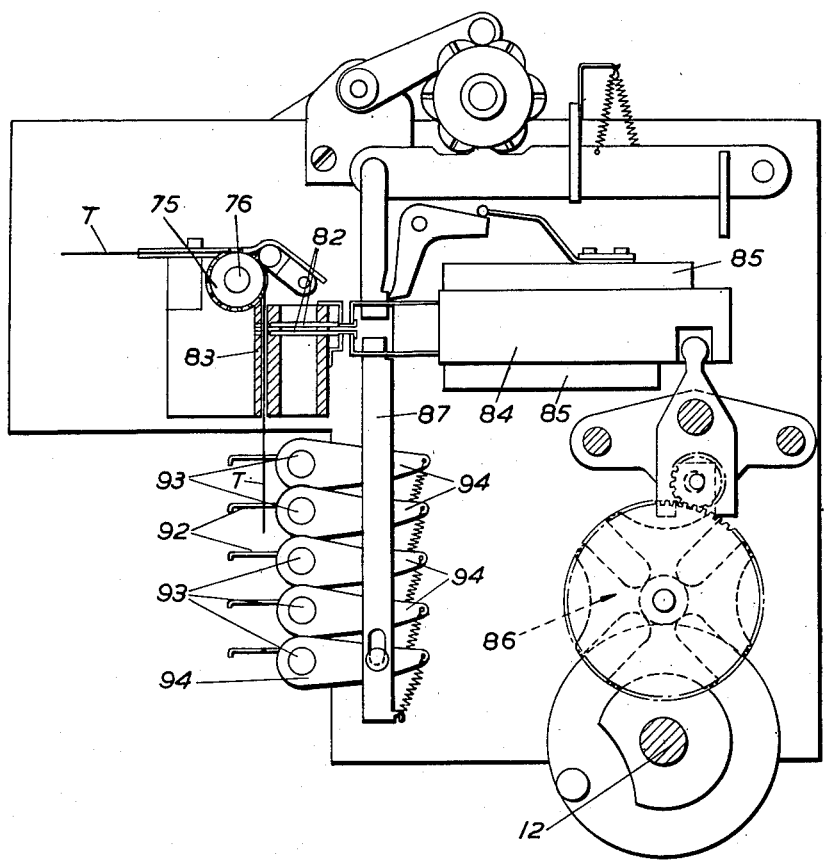

Fig. 3 illustrates a portion of a statement which has been printed under control of a tape and on which appears the data from the portion of tape shown in Fig. 2, Fig. 4 is a table illustrating sets of signals of predetermined significance from which selection can be made according to the kind of record card from which data is sensed and recorded on a tape, Figs. 5A and 5B together illustrate a plan of a machine for perforating a tape in accordance with data sensed from statistical record cards, Fig. 6 is a pictorial view of the machine as viewed in the general direction of arrow VI, Fig. 5A, Fig. 7 is a section through the sensing device for the set-up mechanism of the machine, Fig. 8 is an elevation, partly in section of the sensing device shown in Fig. 7, Fig. 9 is a view looking in the direction of arrow IX, Fig. 5A, and shows some of the driving mechanism, Fig. 10 is a pictorial view, partly exploded, of a clutch included in the driving mechanism for the card feeding apparatus, Fig. 11 illustrates the tape punching unit, Fig. 12 illustrates mechanism for feeding the tape through the tape punching unit.

Figure 13:
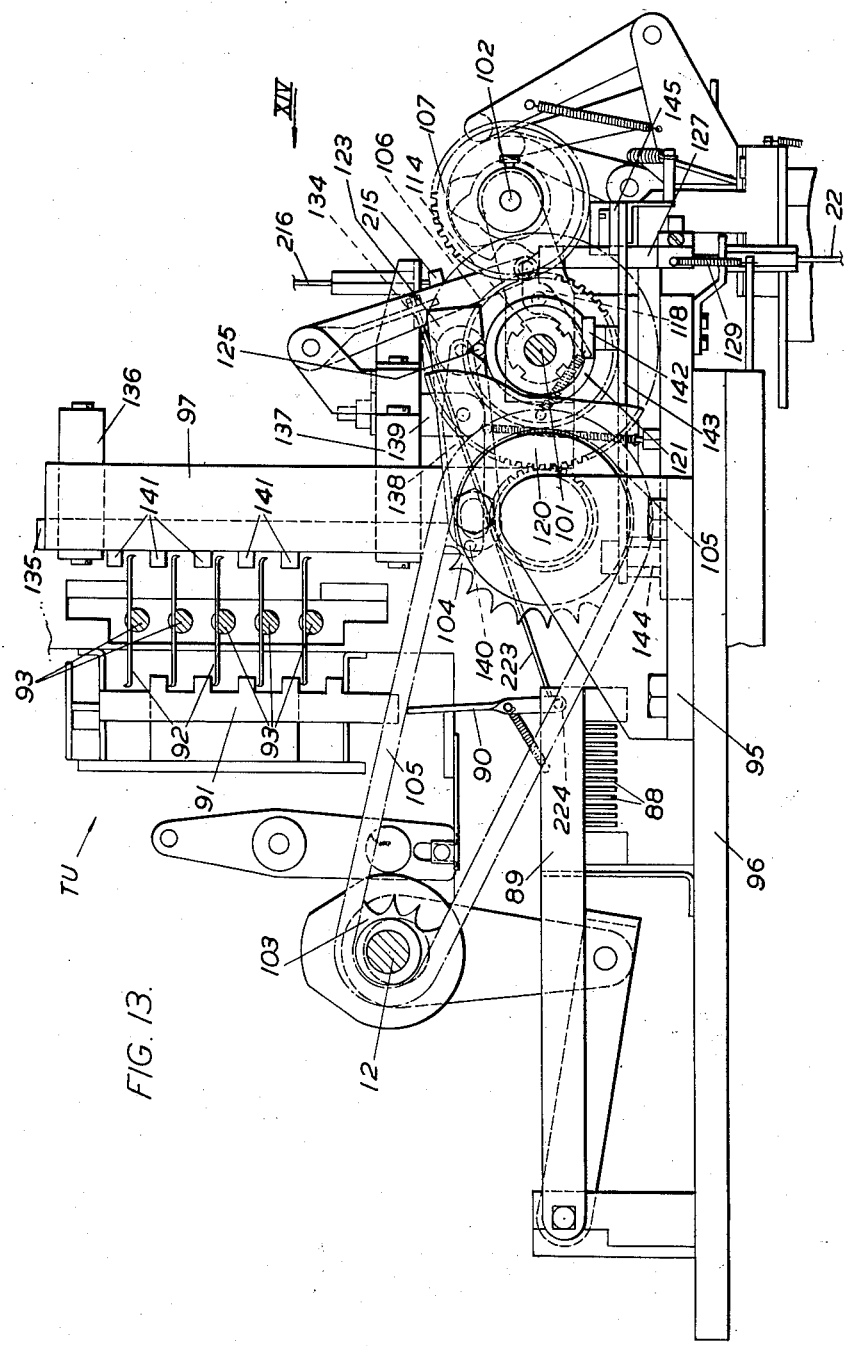

Fig. 13 is an end elevation of part of the end-of-card signal unit,

Fig. 14 is an elevation looking in direction of arrow XIV, Fig. 13,

Fig. 15 is a section on line XV—XV, Fig. 14,

Figs. 16 and 17 are pictorial views of the end-of-card signal unit,

Fig. 18 is a pictorial view of some of the sensing device.

Fig. 19 is a front elevation of the stop basket for the end-of-card signal unit, Fig. 20 is a top plan of Fig. 19, some parts being omitted.

Fig. 21 is an elevation looking in direction of arrow XXI, Fig. 19,

Fig. 22 is an elevation looking in direction of arrow XXII, Fig. 19.

Fig. 23 is an elevation of mechanism for initiating operation of part of the end-of-card signal unit, and Fig. 24 is a view looking in direction of arrow XXIV, Fig. 23.

The machine herein described is constructed to produce from perforated record cards a tape T, of which a portion is illustrated in Fig. 2, which can be employed to control a machine, such as a teleprinter, to produce a printed bank statement, a portion of one such statement being illustrated in Fig. 3.

The information contained on the portion of tape shown in Fig. 2 and in the top line of the statement, Fig. 3, has been obtained from a statistical record card similar to that shown in Fig. 1. A statement of the kind illustrated is made up from a plurality of individual record cards of which the first card is an old or first balance card, which may be either a debit or a credit card, a succession of entry cards, which may be either debit or credit cards, and a new or last balance card, which also may be a debit or a credit card. The card illustrated in Fig. 1 is a last balance credit card as is signified in card column No. 31, which is a control column, by a control hole 1 indicating that it is a new or last balance card and a control hole 2 indicating it is a credit card.

If the card illustrated in Fig. 1 had been an old or first balance card it would also contain a control hole in the No. 5 position of column No. 31, while if it was an entry credit card it would have a control hole only in position No. 3 of column No. 31, and if it was an entry debit card it would have a control hole only in position No. 4 of column No. 31. Further had the card been a balance debit card it would have a control hole in the No. 4 position of column No. 31 instead of in the No. 3 position of the column.

It will be understood that between successive card entries as punched in the tape T there must be a number of signals to control the operation of the teleprinter or similar machine which is to be controlled by the tape. Such signals include a line feed signal, indicated on the chart shown in Fig. 4 by the letters LF, and a carriage return signal CR. A last balance card is indicated by a Bell signal, and a signal is provided to effect the printing on the statement of a D or a C to indicate whether a balance amount is debit or credit. A space signal is also required to obtain, as indicated at 3, Fig. 3, a space between the amount and the D or C. With cards of the kind shown in Fig. 1 the first information sensed therefrom is always a date in figures so that the first data punched on the tape from any card must be preceded by a figure shift signal. To ensure that this precedent figure shift signal is punched on the tape the end of card signals, as shown in Fig. 4, includes for all cards a space signal S followed by a letter shift signal LS and this is succeeded by a figure shift signal FS. For purposes of controlling the teleprinter a carriage return signal or a bell signal is usually punched twice in the tape as shown in Figs. 2 and 4.

As will hereinafter be described the set end-of-card signals as indicated in Fig. 4 are punched into the tape T primarily under control of card column No. 31, the sets of signal determining devices comprising cam pieces supported by a rotatable drum and selection of a set of signals being determined by a stop set up under control of a testing device while it is testing set-up members representative of data contained in the No. 31 column of a card.

A card-to-tape punching machine having apparatus according to the present invention incorporated therein is illustrated diagrammatically in Figs. 5A and 5B. Some of the mechanisms incorporated in the machine are described in the specifications of co-pending United States applications Serial Nos. 362,104 and 354,100 and accordingly only those parts of the machine necessary to the understanding of the present invention will be described in detail herein.

Referring to Figs. 5A and 5B, the machine comprises a card sensing unit CS, a translator unit TU, a tape-punching unit TP, and an end of card signal selector unit ECSS, all of which are driven by any suitable means such as an electric motor not shown.

Record cards are contained in a magazine 4, Figs. 5A and 6, from which they are fed one at a time, in known manner to a vertically reciprocable card chamber, not shown, which by means forming no part of the present invention raises the card in the chamber into co-operation with a set-up mechanism of known construction comprising columns of set-up members 5, Fig. 6, each column, as is customary, comprising a set-up member for each data-indicating position in a vertical column of a record card. Thus as each vertical column of a card has twelve data indicating positions, see Fig. 1, each column of set-up members comprises twelve set-up members.

The set-up members 5 of each column are displaceable vertically relative one to the other so that when a card is raised into co-operation therewith those set-up members which are not aligned with data-indicating perforations in the card are raised by the card. Accordingly, the set-up members which have not been raised represent the data recorded in the card by the perforations formed therein. The timing of the card chamber operating mechanism is such that the chamber retains a card in raised position while a sensing device senses the set-up members column by column and the chamber is not lowered until the sensing operation is completed.

The machine is driven by a continuously rotating shaft 6, Figs. 5A and 6, and effects continuous rotation of a gear wheel 7 which through a pinion 8 and gear wheel 9 effects continuous rotation of a driving shaft 10 which through a 1.1 ratio gearing 11, Fig. 5B, drives a shaft 12 from which the punch unit TP is operated to effect a punching operation on the tape T once during each revolution, hereinafter referred to as a cycle, of the shaft 10. The tape punching unit TP and the mode of operation thereof is as described in the specification of the aforesaid co-pending application Serial No. 362,104. Movement of the sensing device is controlled by the shaft 10 and the sensing device is constructed as described in the specification of the aforesaid co-pending application Serial No. 354,100, certain parts of the sensing device will, however be described below as this device also controls the end-of-card signal selector unit.

The sensing device comprises a first column 13, Figs. 7 and 8, of sensing elements and a second column 14 of sensing elements mounted one in advance of the other in a carriage which includes a pair of end frames 15, the carriage being movable stepwise along a rack 16, Fig. 6, under control of escapement mechanism as described in the specification of the aforesaid co-pending application Serial No. 354,100.

Each column 13, 14 comprises for each data-indicating position in a vertical column of a card sensing pin 17, Fig. 7, a hatchet pin 18, and an actuator 19. The first column 13 also includes an initiator device to initiate operation of a part of the end-of-card signal selector unit in the manner described below, the initiator device comprising a thirteenth sensing pin 17a, Fig. 18, a hatchet pin 20, an actuator 21, and a Bowden wire 22, Fig. 8, connection between the actuator 21 and wire 22 being effected by a latching lever 23 which, as described in the specification of the aforesaid co-pending application Serial No. 362,104 controls the carriage escapement mechanism.

The sensing pins 17 are supported by a vertically reciprocable carrier comprising a bar 24 vertically reciprocable in the end frames 15 and plates 25, 26 movable with the bar 24. The pins 17 are urged downwards, as viewed in Fig. 7 by springs 27. The bar 24 is supported by arms 28 pivoted on a spindle 29 mounted in the end frames 15 and to one end of the bar 24 is secured a block 30, Fig. 8, having a horizontal slot in which is located the tongue portion of a tongued plate 31, carried by a shaft 32 rockable in frame plates 33, Figs. 5A and 9, which support the sensing mechanism for sensing the set-up members 5.

Reciprocation of the bar 24 is effected from shaft 10 to which is secured a clutch dog 34, Fig. 9, with which co-operates a clutch pawl 35 carried by a clutch plate 36 freely mounted on the shaft 10. Secured to the clutch plate 36 for movement therewith is an eccentric 37 provided with an eccentric strap 38 the end of which is pivoted on a stud 39 carried by a lever 40 pivoted on a fixed shaft 41. The lever 40 is connected at 42 to a link 43 which is also connected to an arm 44 secured to the shaft 32. Thus when the clutch 34, 35, 36 is operative the link 43 rocks the arm 44 and shaft 32 thereby causing the bar 24 to be reciprocated vertically to effect sensing of the set-up members 5. The block 30 is slidable lengthwise of the tongued plate 31 as the carriage is moved along the rack 16 and the shaft 10 is rotated at a speed such that during each cycle thereof, unless operation of the carriage is interrupted in the manner described in the specification of co-pending application Serial No. 354,100, the columns 13, 14 of sensing elements sense the columns of set-up members 5 in succession, the second column 14 sensing a column of set-up members in the sensing cycle next following the cycle during which it was sensed by the first column 13 of sensing elements.

The card feeding mechanism and the card chamber operating mechanism is driven by a shaft 45, Figs. 5A, 9, 10, 23 and 24, which is coupled to the gear wheel 7 by a clutch device Fig. 10. The clutch device comprises a clutch dog 46 secured by screws 47 to the boss of the gear wheel 7, a disc 48 secured to the shaft 45 and a pawl 49 pivoted at 50 on the disc 48. The pawl 49 is urged towards the dog 46 by a spring 51 and is tripped out of the dog by a trip lever 52 secured to a trip spindle 53. An arm 54 is also secured to the trip spindle 53 and is rockable by a bell-crank 55 pivoted at 56 on a fixed bracket 57 for rocking movement by a Bowden wire 58. The Bowden wire 58 is operated by a plate 59, Fig. 9, pivoted freely on the rocking shaft 32.

As has been mentioned above, the card feeding mechanism and the card chamber operating mechanism is inoperative during the sensing of the set-up members 5 and during this period the shaft 45 is stationary. When, however, the device reaches the end of its sensing path the carriage is engaged by a trip member 60, Fig. 9, secured to a rocking shaft 61 supported in the frames 33. The shaft 61 is rocked by the shaft 32 through a plate 62 secured to shaft 32, a connecting piece 63 pivoted at 64 to the plate 62, and an arm 65 secured to shaft 61. Connection between piece 63 and arm 65 is by a slot 66 in arm 65 and a pin 67 carried by piece 63. The connecting piece 63 is sprung towards the plate 59 by a spring 68.

During sensing operations the shaft 61 and member 60 are rocked in unison with shaft 32 but when the member 60 engages the carriage, signifying that the carriage has reached the end of its forward movement, the connecting piece 63 pivots about pin 67, clockwise as viewed in Fig. 9, so that an abutment 69 on the piece 63 engages the plate 59 thereby moving counter-clockwise, as viewed in Fig. 9, and effecting operation of the Bowden wire 58 which rocks bell-crank 55 thus, through arm 54, spindle 53, and trip lever 52 releasing the pawl 49 for cooperation with dog 46 to effect one revolution of shaft 45. As the pulse imparted by wire 58 is of short duration the lever 52 is restored to its tripping position before the pawl 49 again reaches the position shown in Fig. 10.

The carriage is returned to its starting position, by known means forming no part of the present invention, immediately after it has been engaged by the member 60 and it takes four cycles of the shaft 10 to return the carriage to its starting position. Accordingly, the tongued plate 31 must be rendered inactive during the return movement of the carriage and this is effected by an arm 70, Fig. 9, secured to shaft 45 and carrying a roller 71 to engage a bell-crank 72 pivoted at 73 to a frame 33a and urged by a spring 74 towards the clutch pawl 35. While shaft 45 is stationary roller 71 engages the bell-crank 72 and holds it out of the path of pawl 35. On rotation of shaft 45, however, roller 71 disengages bell-crank 72 so that the latter is sprung into the path of pawl 35 and trips the pawl out of engagement with clutch dog 34 thereby interrupting operation of shaft 32 although shaft 10 continues to rotate.

The tape recording unit formed by punch unit TP is constructed and operates as described in the specification of co-pending application Serial No. 362,104 and accordingly will be described herein only in-so-far as is necessary to the understanding of the present invention.

Referring to Figs. 11, 12, and 13, the punch unit is driven by the shaft 12 and comprises a pin wheel 75, Fig. 11, secured to a shaft 76, the shaft 76 being rotated by a ratchet wheel 77, Fig. 12, actuated by a pawl 78 on a pawl-carrying arm 79 pivoted about the axis of shaft 76 and operated by a link 80 mounted on an eccentric 81 secured to shaft 12. Recording on the tape is effected by recording elements consisting of rows of punches 82, Fig. 11, arranged to co-operate with a die-plate 83 and actuated by a punch-operating member 84 slidable in guides 85 under control of a Geneva gear device 86 driven by shaft 12. For the purposes of the present invention only the lower row of punches 82 need be considered and selection of these punches is effected by the interpolation of vertical bars 87 between the ends of the punches of the lower row and the punch-operating member 84. Conditioning of bars 87 is by conditioning means formed by the translator unit TU which comprises slotted code bars 88, rocking bars 89 and members 90 carried by the bars 89 to effect actuation of toothed bars 91, Fig. 13, which through conditioning plates 92 rock rods 93 to which are secured arms 94, Fig. 11, to actuate the bars 87. The conditioning plates 92 extend on opposite sides of the rods 93 and the actuation thereof by the toothed bars 91 results, as described in the specification of co-pending application Serial No. 362,104, from the sensing operations performed by the second column 14 of sensing elements.

The conditioning plates 92 are, however, also operated by the end-of-card signal selector unit ECSS so as to effect punching in the tape of signals of predetermined significance to succeed the signals punched in the tape as the result of the testing operations of the second column 14 of sensing elements.

The end-of-card signal selector unit is illustrated more particularly in Figs. 13 to 21 although initiation of operation thereof is, as stated above, controlled by the sensing of card column No. 31 by the sensing elements of the aforesaid first column 13 and in general, the signal selector unit may be said to comprise a drum unit DU and a stop basket SB.

The drum unit comprises a base plate 95, Figs. 13, 14, 16 and 17, secured to the base 96 of the translator unit. Two side frames 97, 98 are fixed to the base 96 and support bearing blocks 99, 100 carrying two shafts 101, 102 of which the shaft 101 is the main or drum shaft of the unit. Shaft 101 is driven from the continuously rotating shaft 12 by sprockets 103, 104, chain 105, intermediate gear 106 and gear 107, Figs. 5B, 13 and 14.

Slidably mounted on the shaft 101 is a cam-carrying drum 108 to which is secured a member 109 having a peripheral groove 110, Fig. 14. The opposite end of the drum 108 is provided with two tongues 111 slidable freely in slots formed in the flange 112 of a member 113 freely mounted on the drum shaft 101. Secured to the drum shaft 101 is a first one-revolution clutch comprising a clutch dog 114 with which co-operates a clutch pawl 115 pivotally mounted on a flange 116 integral with member 113. Also secured to drum shaft 101 is a second one-revolution clutch comprising a clutch dog 117 with which co-operates a clutch pawl 118 pivotally mounted on a flange 119 formed on a gear 120 which is integral with a cam 121 freely mounted on the drum shaft 101. The member 113, and the gear 120 and cam 121 are normally stationary on the driven drum shaft 101 and are retained in the stationary position by detent arms 122, 123 urged respectively by springs into engagement with studs 124, 125 Figs. 14 and 17 on member 113 and gear 120. The clutch pawls 115, 118 are respectively retained in the latched inoperative positions thereof by pivoted latches 126, 127 urged to the latching positions thereof by springs 128, 129 and respectively movable from their latching positions, as will be described below, by a Bowden wire 130 and by the wire 22 referred to above.

The cam-carrying drum 108 is provided with four equispaced slots extending lengthwise of the drum to receive cam pieces 131, Figs. 14 and 15, which are retained in the predetermined positions therefor by retaining plates 132 provided with slots 133, Fig. 14, to locate the cam pieces in said predetermined positions.

The cam pieces 131, according to the positions thereof are, after axial movement of the drum, arranged to co-operate with selected ones of six rollers 134 to control the lengthwise movement of six code bars 135 guided for lengthwise movement by slotted bars 136, 137 secured to the side frames 97, 98. The rollers 134 are carried by levers 138 pivotally mounted in pivot blocks 139 secured to the bar 137 and each lever 138 carries a stud 140, Fig. 13, located in a slot in the lower end of the code bar 135 appropriated thereto and arranged, on raising of the roller 134, to lower the code bar so that teeth 141 formed thereon engage appropriate ones of the conditioning plates 92 to effect rocking of rock rods 93 thereby to condition the lower row of punches 82 by interposing bars 87 between the ends thereof and the punch-operating member 84 as mentioned above. The teeth 141 on each bar 135 are cut according to the predetermined signal to be punched resultant on the operation of the bar 135 by its roller 134.

In the apparatus herein described the cam-carrying drum 108 is arranged, by means of the stop basket to be described below, to be arrested in any one of five predetermined positions and selection is to be made from six predetermined end-of-card signals selected by operation of the code bars 135. Accordingly, in the apparatus being described the cam-carrying drum through the slotted retaining plates 132, has provision for four times thirty cam pieces 131.

Axial movement of the cam-carrying drum 108 is effected by cam 121 which engages a follower roller 142 Figs. 14 and 17, supported by an arm 143 pivotally mounted on a pillar 144 secured to the base plate 95. The arm 143 is connected by a link 145 with a further arm 146 pivotally mounted on a pillar 147 also secured to the base plate 95, the arm 146 carrying a stud 148 engaging in the peripheral groove 110 on the member 109 which, as stated above, is secured to the drum 108. Thus as the arms 143, 146 and link 145 are operated by the cam 121 the stud 148 causes axial movement of the drum 108 along the shaft 101.

To the underside of the link 145 is secured an abutment formed as a stop block 149, Figs. 14 and 16, to co-operate with selected ones of five stops 150a, 150b, 150c, 150d, and 150e in the stop basket SB, the main function of which is to receive control signals during the testing of set-up members 5 representative of card column No. 31, to translate the signals and to cause one of the five stops, as indicated in Fig. 4, to be raised and determine the operating position of the drum 108 relative to the code bars 135.

The control signals are received by the stop basket from Bowden wires 151, Fig. 19, these wires being actuated during sensing of the set-up members 5 representative of card column No. 31 by the first column 13 of sensing elements. The actuators 19 of said first column co-operate with interponents 152, Figs. 7 and 8, of which the four appropriated to the data-indicating positions, Nos. 2, 3, 4 or 5 for a card column, as shown in Fig. 1, are provided with upstanding extensions 153 which, on actuation of the interponents, engage and operate push members 154 each hingedly connected to a push rod 155, Fig. 7. The push rods 155, of which there are four, are each connected to one of the Bowden wires 151 and the push members 154 are engaged by a U-shaped bracket 156 pivoted to a block 157 secured to the top of the carriage for movement therewith. Normally, the push members 154 are retained in the position shown in Figs. 7 and 8 in which position they cannot be engaged by the extensions 153 should the interponents of which they form part be operated. The bracket 156 and push members 154 are retained in the position shown in Figs. 7 and 8 by an abutment 158, Fig. 8, extending laterally from the bracket 156 and riding on the top of a fixed bar 159 extending lengthwise of the path of the carriage. When, however, the carriage reaches the position at which the first column 13 of sensing elements tests the set-up members 5 representative of card column No. 31 in which column, as described above with reference to Fig. 1, the control holes are punched for controlling the stop basket SB, the abutment 158 drops into a depression or slot 160 in the bar 159 so that the pusher members are then disposed for actuation by any of the extensions 153 which may be operated. Simultaneously with the entry of abutment 158 into slot 160 the thirteenth sensing pin 17a of the first column 13 enters a recess or slot 161, Fig. 18, in a further fixed bar 162 to effect operation of the Bowden wire 22 above mentioned and also to control the latching devices for the carriage escapement mechanism as described in the specification of co-pending application Serial No. 354,100.

The impulses imparted by the Bowden wires 151 are received by code bars 163, Figs. 19 to 22, supported for lengthwise sliding movement in side plates 164, 165. Each code bar 163 on receipt of an impulse from its wire 151 is moved lengthwise to the right as viewed in Fig. 19 to a position at which it is latched by a shutter 166 which, as can be seen from Fig. 20, is fixed to a rockable latch spindle 167 urged to latching position by a spring 168. The shutter is common to all four code bars 163 and has an upturned lip 169 and is depressed by a code bar moving to its operative position, the lip 169 being engaged behind a latching tooth 170 on the code bar after the tooth has moved over the lip. On latching of the code bars in the operated positions thereof the inner wires of the Bowdens 151 return to the normal positions thereof.

The shutter 166 is positively operated to release code bars 163 which are retained in active position thereby and release is effected by an arm 171, Fig. 19, secured to the latching spindle 167 and engaged by an arm 172 secured by a boss to an arm 174 pivotally mounted on a fixed spindle 173. The arm 174 carries a roller 175 engaging a cam 176 on the shaft 102. The shaft 102 is rotated by a gear wheel 177, Fig. 17, secured thereto and meshing with the gear 120 so that operation of shaft 102 is effected in timed relation with the axial movement of drum 108.

The code bar 163 in the inactive position thereof, as shown in Fig. 20, is located by the side plate 164 being engaged by a stop formed in the code bar and, on release by the shutter, the code bars are urged towards the plate 164 by pins 178 and springs 179.

The code bars, as is customary in the art, are slotted to co-operate with five test bars 180 which are supported for vertical sliding movement in plates 181, 182 being sprung upwards by pins 183 and springs 184. The test bars 180 each have projections 185, Fig. 21, to pass through the slots in the code bars 163 and in their normal, or inactive positions, as shown in the drawings, they are under control of a restoring member 186, Figs. 19 and 22, common to all five test bars, the restoring member engaging steps 187, Fig. 22, formed in the test bars. In their inactive positions, as can be seen from Fig. 21, the test bars are so disposed that the code bars 163 are located centrally in the gaps formed between the projections 185 on the test bars.

After latching of operated code bars 163 the restoring member 186 is positively actuated to release all of the test bars 180 so that each bar is then under control of its pin 183 and spring 184. When this occurs one of the test bars 180 will find a lane formed by aligned slots in the code bars 163 and so will rise to permit the stop 150 co-operating therewith to be raised and interposed in the path of the stop block 149. The positive operation of the member 186 is effected by a cam 188 on shaft 102, the cam co-operating with a roller 189 carried by an arm 190 rockable about a stud 191, Fig. 19. The arm 190 has a further arm 192 integral therewith and carrying a pin 193, Fig. 22, which is located in a slot 194 in a bracket 195 secured to the member 186. Thus on rocking of the arms 190, 192 by the cam 188 the member 186 is rocked about the axis of its supporting spindle 196 and is raised, as viewed in Fig. 22, to permit lengthwise movement of test bars 180 under control of their pins 183 and springs 184.

Above the test bars 180 and aligned therewith are the stops 150, the stops being supported for lengthwise sliding movement by plates 197, 198 and connected with the test bars 180 by springs 199. A shutter latch 200, common to all of the five stops 150, is supported by a rocking spindle 201 mounted in plates 202 and is urged towards the stops 150 by a spring 203, Fig. 19. For the purpose of releasing a stop 150 which has been latched in its raised, or active position, there is a cam 204 on shaft 102 the cam 204 co-operating with a roller 205 carried by an arm 206 pivoted on a stud 207, Fig. 22 fixed to a bracket 208. Integral with arm 206 is another arm 209 carrying a lateral abutment 210 to engage an arm 211 secured to the rocking spindle 201. Accordingly, at the appropriate time, the cam 204 through abutment 210 and arm 211 rocks the spindle 201 and so disengages the latching shutter 200 from a stop 150 which has been retained thereby in its active position for engagement by the stop block 149.

From the foregoing, it will be understood that as the cams 176, 188, 204 are all on the shaft 102 the shutter 166, restoring member 186, and shutter latch 200 are operated in timed relation one with the other.

Although the Bowden wires 151 impart impulses to the stop basket SB on sensing of the set-up members 5 representative of card column No. 31 and the appropriate stop 150 is set up it will be understood that the end-of-card signal selector unit does not become fully operative to control the punch unit TP until the carriage for the columns 13 and 14 of sensing elements has reached the end of its forward movement and, as stated above, the end-of-card signal selector unit is operative to control the punch unit TP during the four cycles of shaft 10 in which the carriage is being returned to its starting position. Accordingly, on receipt of impulses from the wires 151 the appropriate code bars 163 are moved to the latched positions thereof and the appropriate stop 150 is set up and no further operation of the end of card unit is effected until the wire 130, Fig. 14, is operated.

Operation of wire 130 is effected by a cam 212 on shaft 45, Figs. 16, 23 and 24. The cam 212 co-operates with a roller 213 carried by a bell-crank 214 one arm of which, when the bell-crank is rocked by cam 212, operates the wire 130 to initiate full operation of the end-of-card signal selector unit.

As will be seen from Fig. 1 the first and last columns of a card each record a figure, accordingly when the end of card signals have been punched in the tape T the punch unit TP must be conditioned to punch a figure shift signal to precede the first data item punched in the tape under control from the next succeeding record card. However, when a card being sensed is a balance card the last data item punched in the tape under control of the card is followed by a space and a signal representative of either the letter C or D, as indicated in the bottom line of the transcribed statement shown in Fig. 3. To accommodate this condition the end of card signals punched under control of the apparatus according to the present invention are preceded by a space signal and a letter shift signal as indicated in Fig. 4, these two signals being obtained by causing the first column 13 of sensing devices to be advanced two card column positions past the last column, that is the column representative of card column forty in the present example, of set-up members 5 and to test two dummy bars, not shown, of which the first is a plain bar and the second is drilled with three holes to be entered by three of the sensing pins 17 of said first column 13 of sensing elements. Sensing of the first dummy bar results only in a space signal being punched in the tape and the three holes drilled in the second dummy bar is not representative of any significant data because a two-hole code is employed in recording data in the record cards. Since, however, there are three holes in the dummy bar and any two suffice to cause the punching in the tape of a letter shift signal such a signal is punched in the tape on sensing of the said second dummy bar.

From Fig. 4 it will be seen that each series of end of card signals controlled by drum 108 includes a figure shift signal which ensures that the punch unit TP is conditioned to receive the first figure item from the next succeeding card.

The figure shift signal transmitted to the punch unit under control of drum 108 is initiated by a cam piece 131 on the drum engaging the left-hand roller 134, Figs. 14, 16 and 17, the supporting arm 138 for which is provided with an extension 215, Figs. 16 and 17. When this arm is raised by a cam piece 131 the extension 215 operates a Bowden wire 216 which transmits an impulse to the shift selector mechanism described in the specification of the aforesaid co-pending application Serial No. 362,104.

As is described in the specification of the aforesaid co-pending application Serial No. 354,100, the arrangement of the translator unit TU controlling the toothed bars 91 is such that when no data is transmitted to the unit a space signal will be punched in the tape. To avoid this occurring during control of the punch unit by the drum 108 there is provided a roller 217, Fig. 14, supported by an arm 218 and normally resting in a depression in the periphery of the flange 116. The arm 218 is secured to a rocking shaft 219 supported in brackets 220, 221 and also secured to the shaft 219 is a further arm 222 the free end of which is provided with a hole through which protrudes the threaded end of a hook piece 223. The inner end of the hook piece 223 is engaged over a pin 224, Fig. 13, by which the member 90 which is connected to the code bar 89 in the translator unit controls the bar 91 relative to the transmission of a space signal from the translator unit.

When the flange 116 commences to rotate the roller 217 rides out of the depression thus rocking shaft 219 and causing the hook piece 213 to move to the right, as viewed in Fig. 13, thereby rocking the member 90 to an inactive position in which it cannot co-operate with its bar 91. The member 90 is restored when the roller 217 is again seated in the depression in the periphery of flange 116.

The end-of-card signal selector unit operates in the manner now to be described.

On sensing of the column of set-up members 5 representative of card column No. 31 by the first column 13, Figs. 7 and 8, of sensing elements the appropriate Bowden wires 151 are actuated and transmit impulses to the stop basket SB, Fig. 19. Simultaneously, the sensing pin of the initiator device effects actuation of Bowden wire 22, Figs. 8 and 14.

The impulses transmitted to the stop basket SB effect setting of the appropriate code bars 163, Fig. 19, which are retained in their set positions by the shutter 166.

Actuation of the Bowden wire 22 effects rocking of the pivoted latch 127 so that it is disengaged from the clutch pawl 118 which is then spring-urged towards the clutch dog 117 with which it becomes engaged so that the gear 120 and cam 121 are rotated with the continuously rotating drum shaft 101. The gear 120 causes rotation of shaft 102 by reason of its meshing engagement with gear 177 or shaft 102.

On angular movement of cam 121 the roller 142, Figs. 14 and 17, causes the linkage 143, 145, 146, through stud 148 and member 109, to move the cam-carrying drum 108, and the link 145 and stop block 149 to the left, as viewed in Fig. 14. When the cam 121 has completed one-half of a revolution the flat portion X thereof, Figs. 14, 16 and 17, will be engaged by the roller 142 and the drum 108 will have reached its extreme left-hand position, as viewed in Fig. 14, at which time the stop block 149 will be just clear of the first stop 150a as illustrated by dotted lines in Fig. 14.

While the roller 142 is engaged by the flat portion X of the cam 141 the newly selected stop 150 will be caused to rise for engagement by the stop block 149 as will now be described.

At the end of the movement of stop block 149, as just described, the stop 150 which was raised during the preceding operation of the end-of-card signal selector unit still remains in the raised position thereof, being latched in its raised position by the shutter latch 200, Figs. 19 and 22. However, on rotation of shaft 102 the cam 204 thereon rocks the arm 211 so rocking the shutter spindle 196 and shutter latch 200 clockwise, as viewed in Fig. 22, so releasing the raised stop 150 which immediately drops to its inactive position under the action of its spring 199. The shutter latch 200 then returns to its normal, active position and is ready to latch in position the next raised stop.

As was described above, the test bars 180 are normally retained in their lower, or inactive, positions by the restoring member 186, Figs. 19 and 22, and when the shutter latch 200 has been restored to its active position the cam 188 operates through arms 190, 192, pin 193, and bracket 195, to release all the test bars 180 so that, under the action of their pins 183 and spring 184 they will each tend to be urged upwards and that one thereof which is positioned to pass through aligned slots in the code bars 163 will move upwards so that the stop 150 with which it co-operates will be interposed into the path of the stop block 149 and will be latched in the active position by the shutter latch 200. The restoring member 186 is then returned to its active position and in being so returned restores to their inactive positions those test bars 180 which have not been moved to the fully active position thereof.

When the restoring member 186 has been returned to its active position the cam 176 on shaft 102, through arms 171, 172, 174 rocks the latching spindle 167 and shutter 166 thus releasing the active code bars 163 and permitting them to be restored to their inactive positions by their pins 178 and springs 179.

About this time the cam 121 permits the drum 108 and stop block 149, through roller 142 and linkage 143, 145, 146, to move to the right, as viewed in Fig. 14, and this movement continues until the stop block 149 is arrested by the active stop 150 after which the cam 121 completes its one revolution as is determined by the clutch pawl 118 being engaged by the latch 127 and thereby tripped out of engagement with the clutch dog 117. The drum 108 is now set axially in accordance with the position required by column No. 31 of the card and no further action of the end-of-card signal selector unit takes place until the shaft 45, Figs. 23, 24, is rotated and the cam 212 operates the Bowden wire 130.

On actuation of wire 130 the pivoted latch 126 is rocked thereby thus permitting the clutch pawl 115 to be spring-urged into operative engagement with the clutch dog 114 so that the cam carrying drum 108 is clutched to drum shaft 101. During the one revolution of the drum, before the pawl 115 is again removed from operative engagement with dog 114, the cam pieces 131 on drum 108, in predetermined order, operate the levers 138, Fig. 14, carrying the rollers 134 thereby effecting operation of the appropriate conditioning plates 92, Fig. 13, and rocking rods 93 to effect interpolation of the appropriate bars 87, Fig. 11 between the punches 82 and the punch-operating member 84, and also, through wire 216 transmitting a figure shift signal to the shift selector mechanism.

The chain and gear drive between shaft 10 and shaft 101 has a reduction ratio of 4:1 so that the single revolution of drum shaft 101 is effected during four cycles of shaft 10 thereby permitting the punching of end-of-card signals during each of the four cycles of shaft 10, and according to the kind of record card which has controlled the setting of drum 108, as is illustrated in Fig. 4. Further, as has been stated above, the four cycles of the shaft 10 during which signals are punched in the tape under control of the end-of-card signal selector unit are the cycles during which the carriage for the sensing device is being returned from the fully advanced position thereof to the starting position thereof.

What I claim is:

1. In a machine for recording data-indicating signals on a tape under control of statistical record cards, apparatus for recording on the tape end-of-card signals of predetermined significance in succession to signals representative of data recorded on a record card, said apparatus comprising a sensing device responsive to data indications on a record card and movable stepwise column by column in relation to a record card, a tape recording unit including tape feeding means and recording elements operable to record signals on a tape fed by the tape feeding means, a continuously rotatable driving shaft coupled to the sensing device and to the tape recording unit to effect operation thereof, the tape recording unit being operable to record a signal on the tape during each revolution of the driving shaft, conditioning means to receive signals from the sensing device and to condition the recording elements for a recording operation in accordance with the signals so received, a plurality of code bars each appropriated to an end-of-card signal of predetermined significance and connected with said recording element conditioning means to effect operation thereof, a signal selector unit including manually pre-settable cam-pieces carried by a normally inactive rotatable carrier mounted for axial movement to and from a datum position thereof to position the cam-pieces relative to the code bars to effect operation thereof on rotation of the carrier, a stop basket including stops selectively settable under control of the sensing device to determine the extent of axial movement of the carrier from said datum position thereof, and actuating means operable to effect rotation of the carrier on completion of the sensing of a record card by the sensing device.

2. Apparatus according to claim 1, wherein the carrier comprises a drum supported for rotation with and for movement axially of a drum shaft connected with said driving shaft for continuous rotation thereby at an angular velocity providing a predetermined number of revolutions of the driving shaft for one revolution of the drum shaft, and including a first one-revolution clutch to couple the drum to the drum shaft for a single revolution therewith, a first clutch-actuating means operation of which is initiated by the sensing device on completion of stepwise testing movements thereof, drum-sliding means operable to move the drum axially in timed relation with operation of the stop basket, and an abutment movable with the drum-sliding means to co-operate with a stop thereby to determine a selected axial position of the drum.

3. Apparatus according to claim 2, including a second one-revolution clutch to couple said drum-sliding means to the drum shaft for one revolution thereof, an initiator device integral with the sensing device to initiate operation of said second clutch, and a second clutch-actuating means connecting the second clutch with the initiator device.

4. Apparatus according to claim 3, wherein the drum-sliding means includes a cam integral with the second clutch, and a linkage connecting the cam with the drum, said cam through said linkage effecting axial movement of the drum in timed relation with the operation of the stop basket.

5. Apparatus according to claim 4, wherein the stop basket includes code bars to determine the setting of the stops and supported for lengthwise movement to active positions thereof by impulses imparted thereto by the sensing device, a code bar shutter to retain code bars in the active positions thereof, code bar shutter release means operable in timed relation with said drum shaft to cause the shutter to release active code bars, code bar restoring means to restore active code bars to their inactive positions on release by the shutter, and stop control means operable in timed relation with the code bars to permit setting of a stop as determined by the active code bars.

6. Apparatus according to claim 5, wherein the stop control means includes a restoring member operable in timed relation with the code bar restoring means to restore the stops to the inactive position thereof, and stop actuating means co-operating with the stops to permit setting thereof on release from the control exercised thereon by said restoring member.

7. Apparatus according to claim 6, wherein each stop comprises a stop portion supported for lengthwise movement into and out of the path of said abutment, a test bar supported for lengthwise movement and co-operation with the code bars, a spring connecting the stop portion to follow that of the test bar, a latching shutter to latch a stop portion in the active position thereof, and latching shutter operating means operable in timed relation with said code bar shutter and restoring member to release a stop portion from the active position thereof and permit it to be restored to its inactive position under the action of said spring.

8. In a machine for recording data-indicating signals on a tape under control of statistical record cards, apparatus for recording on the tape signals of predetermined significance in succession to signals representative of data recorded on a record card, said apparatus comprising a sensing device responsive to data indications on a record card and movable stepwise column by column in relation to a record card, a tape recording unit including tape feeding means and recording elements operable to record signals on a tape fed by the tape feeding means, a continuously rotatable driving shaft coupled to the sensing device and to the tape recording unit to effect operation thereof, the tape recording unit being operable to record a signal on the tape during each revolution of the driving shaft, conditioning means to receive signals from the sensing device and to condition the recording elements for a recording operation in accordance with the signals so received, and an end-of-card signal selector unit coupled to the conditioning means and operable under control of the sensing device to condition the recording elements to record on the tape selected signals of predetermined significance, said selector unit including a drum shaft connected with said driving shaft for continuous rotation thereby at an angular velocity providing a predetermined number of revolutions of the driving shaft for one revolution of the drum shaft, a cam-carrying drum supported by the drum shaft for movement axially thereof and angularly therewith, a one-revolution clutch to couple the drum to the drum shaft for a single revolution therewith, clutch-actuating means operation of which is initiated by the sensing device on completion of stepwise testing movements thereof, cam pieces carried by the drum to effect actuation of said conditioning means, a stop basket, selectively settable stops supported in said stop basket, code bars to determine the setting of the stops and supported for lengthwise movement to active positions thereof by impulses imparted thereto by the sensing device, a code bar shutter to retain code bars in the active positions thereof, code bar shutter release means operable in timed relation with said drum shaft to cause the shutter to release active code bars, code bar restoring means to restore active code bars to their inactive positions on release of the shutter, stop control means operable in timed relation with said code bars to permit setting of a stop as determined by the active code bars, drum-sliding means operable to move the drum axially in timed relation with the operation of the stops, and an abutment movable with the drum-sliding means to co-operate with an active stop thereby to determine a selected axial position of the drum.

9. Apparatus according to claim 8, wherein the stop control means includes a restoring member operable in timed relation with the code bar restoring means to restore the stops to the inactive position thereof, and stop actuating means co-operating with the stops to permit setting thereof on release from the control exercised thereon by said restoring member.

10. Apparatus according to claim 9, wherein each stop comprises a stop portion supported for lengthwise movement into and out of the path of said abutment, a test bar supported for lengthwise movement and co-operation with the code bars, a spring connecting the stop portion to follow that of the test bar, a latching shutter to latch a stop portion in the active position thereof, and latching shutter operating means operable in timed relation with said code bar shutter and restoring member to release a stop portion from the active position thereof and permit it to be restored to its inactive position under the action of said spring.

References Cited in the file of this patent

UNITED STATES PATENTS

| | | |
|---|---|---|
| 2,340,800 | Doty | Feb. 1, 1944 |
| 2,346,268 | Mills et al. | Apr. 11, 1944 |
| 2,620,878 | Rabenda | Dec. 9, 1952 |